April 4, 1967 J. G. CHITOURAS ET AL 3,312,277

HEAT SINK

Filed March 22, 1965

INVENTORS
JOHN G. CHITOURAS
JOHN H. SUNUNU

BY Rines and Rines

ATTORNEYS

United States Patent Office
3,312,277
Patented Apr. 4, 1967

3,312,277
HEAT SINK

John G. Chitouras, Arlington, and John H. Sununu, Concord, Mass., assignors, by mesne assignments, to Astrodyne, Inc., Burlington, Mass., a corporation of Massachusetts Filed Mar. 22, 1965, Ser. No. 441,830
7 Claims. (Cl. 165—185)

The present invention relates to heat sinks and, more particularly, to heat sinks of extruded aluminum and the like.

There has been a trend in recent years to reduce the physical volume of devices embodying heat-generating electrical devices as transistors and the like. This has led to the demand for heat sinks capable of dissipating greater quantities of heat for a given volume occupied by the heat sink. In general, the dissipating capacity of a heat sink increases as the number of fins is increased. There is, however, a limitation in the state of the art extrusion processes, as discussed more fully hereinafter, of the allowable minimum distance between fins for any particular length of fin. It is an object of the present invention, accordingly, to provide a heat sink of extruded aluminum or the like having a greater number of fins in any particular volume than has heretofore been possible using present day extrusion techniques.

Other and further objects will be made evident in the description to follow and will be particularly pointed out in the appended claims.

Generally, and by way of summary, the objects of the invention are attained in a heat-sink apparatus having, in combination, symmetrical left- and right-hand heat-conductive members each having an L-shaped base. The longitudinal arm of the L is provided with tongue and groove elements and the transverse arm is intermediately provided with a longitudinal support element extending in a direction opposite to the said longitudinal arm and carrying a plurality of longitudinally spaced fins extending transversely outward from opposite sides of the support element. The members are joined with their longitudinal arms connected back-to-back by the tongue and groove elements thereof and their adjacent pluralities of transverse fins are interleaved with one another.

The invention will now be explained with reference to the accompanying drawing in which, FIG. 1 is an isometric view of a heat sink embodying the interleaved construction herein described;

Figure 1:
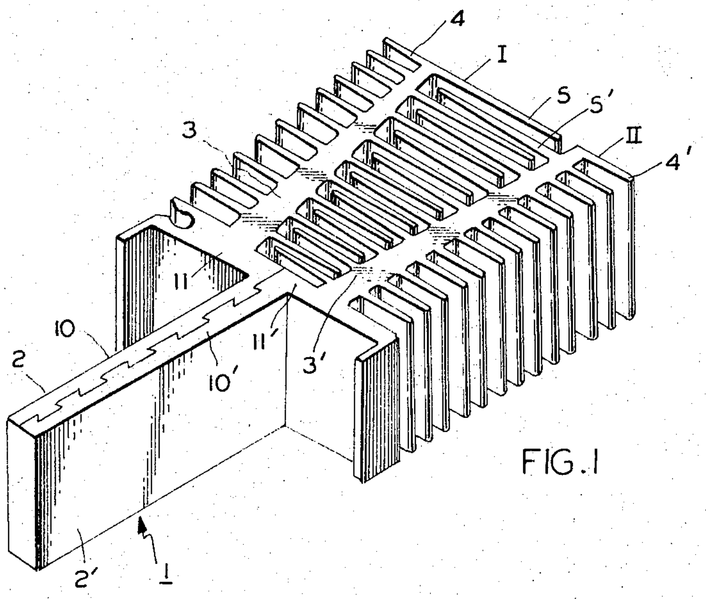

Referring now to FIG. 1, a heat sink 1 is shown comprising symmetrical left- and right-hand heat-conductive members I and II, respectively, each having an L-shaped base 2, 2', respectively. The longitudinal arms of the L, shown at 10, 10', respectively, are adapted to receive a heat-producing element as, for example, a transistor or the like, not shown, heat from the element passing from the said longitudinal arms to transverse arms, shown at 11, 11', respectively, to longitudinal support elements 3, 3', respectively, and thence to a plurality of longitudinally-spaced transversely-extending fins. The said longitudinal support elements are located intermediately along the respective transverse arm and extend longitudinally in a direction opposite the longitudinal arms.

As has been mentioned, there is a definite correlation between the length of fin and the space between fins attainable by state of the art extrusion techniques. While it is desirable from a heat dissipating viewpoint to have the fins very close together, extrusion methods place a practical minimum limitation on the distance between adjacent fins. Thus the outwardly disposed fins, shown at 4, 4', may be, for example, ½ inch long and the minimum attainable distance between adjacent fins at the free ends thereof is about $\frac{3}{16}$ inch. The inwardly disposed fins, shown at 5, 5', may be, for example, $\frac{13}{16}$ inch long and the minimum distance between adjacent fins at the free ends thereof is about ¼ inch.

Figure 2:
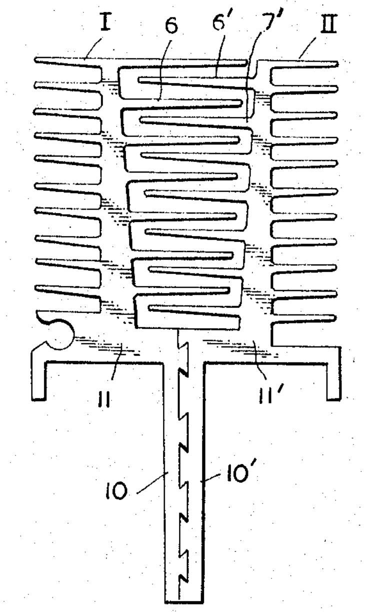
FIG. 2 is an plan view of the heat sink of FIG. 1.
Figure 3:
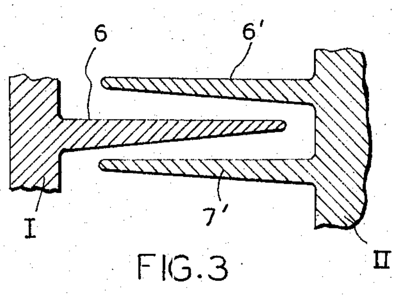
FIG. 3 is a fragmentary section view showing, in detail, interleaved fins of the heat sink of FIG. 1.

Heat sinks in modern apparatus must, however, occupy a minimal space. The adjacent transverse fins 5, 5' of the present invention are, therefore, interleaved to reduced the distance between adjacent fins. To effect such interleaved construction the said inwardly disposed fins of one member are slightly longitudinally displaced from the inwardly disposed fins of the other member. For example, the fins 6' and 7', shown in FIGS. 2 and 3, are displaced longitudinally from the fin 6 to enable the fin 6 to be interleaved between the fins 6' and 7'. In general, the heat dissipating capacity of the interleaved heat sink shown is about 1.8 times the dissipating capacity of a heat sink occupying the same volume, but with the fins spaced the normally allowable minimum distance apart and not interleaved.

The outwardly and inwardly disposed parallel fins are extruded integrally with the longitudinal support elements 3, 3'. The fins are tapered in cross-dimension from the longitudinal support elements toward the free ends thereof and the longitudinal support elements, as shown in FIG. 2, also are tapered in cross dimension from the lower toward the upper ends thereof to effect heat matching to the fins disposed longitudinally therealong. In addition the support elements are tapered on the inwardly disposed sides only so that the outwardly disposed fins are uniform in length.

Figure 4:
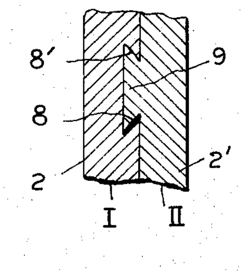
FIG. 4 is a fragmentary section view of a portion of the base of the heat sink of FIG. 1 showing, in detail, an interlocking tongue and groove joint.

To effect maximum heat transfer between the members I and II and to assure good mechanical connection therebetween, lateral tongues and grooves are provided along the longitudinal arms 10, 10' of the L. The sides, shown at 8 and 8' in FIG. 4, of each groove are oppositely longitudinally inclined. The tongues are similarly shaped to the grooves but are slightly smaller in cross dimensions. Thus the tongues may be press fitted into corresponding grooves (to provide tight engagement between tongues and grooves) and at the same time the adjacent pluralities of transverse fins 5, 5' move into interleaved position, as before discussed. The heat sink 1 thereafter acts as a unit to dissipate heat from a heat-producing element. The tongue and groove construction, in addition to providing good mechanical and heat transfer characteristics, also provides a large contact surface between the said longitudinal arms connected back-to-back in the manner shown.

Thus, there is provided by the concept herein discussed, a heat sink having maximum heat dissipating capacity for a given volume occupied thereby and yet a heat sink that may be produced using presently available extrusion techniques; one that is particularly useful when blowers or the like are used to force air across the fins.

Modifications of the invention herein described will occur to those skilled in the art and all such modifications are considered to be within the spirit and scope of the invention as defined in the appended claims.

What is claimed is:

1. Heat-sink apparatus having, in combination, symmetrical left- and right-hand heat-conductive members each having an L-shaped base, the longitudinal arm of the L of which is provided with tongue and groove elements and the transverse arm of which is intermediately provided with a longitudinal support element extending in a direction opposite to the longitudinal arm and carrying a plurality of longtiudinally spaced fins extending transversely from opposite sides of the support element, the members being joined with their longitudinal arms connected back-to-back by the tongue and groove elements thereof and their adjacent pluralities of transverse fins interleaved with one another.

2. Heat-sink apparatus as claimed in claim 1 and in which each of the longitudinal support elements is tapered in cross dimension from the lower to the upper end thereof.

3. Heat-sink apparatus as claimed in claim 2 and in which the support elements are tapered at their respective inwardly disposed sides and outwardly disposed ones of said fins are uniform in length.

4. Heat-sink apparatus having, in combination, symmetrical left- and right-hand heat-conductive members each having an L-shaped base, the longitudinal arm of the L of which is provided with interlocking tongue and groove elements and the transverse arm of which is intermediately provided with a longitudinal support element extending in a direction opposite to the said longitudinal arm and carrying a plurality of longitudinally spaced fins extending transversely from opposite sides of the support element, the members being joined with their longitudinal arms connected back-to-back by the tongue and groove elements thereof and their adjacent pluralities of transverse fins interleaved with one another.

5. Heat-sink apparatus as claimed in claim 4 and in which the interlocking tongue and groove elements engage each other with a press fit.

6. Heat-sink apparatus having, in combination, symmetrical left- and right-hand heat-conductive members each having a substantially L-shaped base, the transverse arm of which is intermediately provided with a longitudinal support element extending in a direction opposite to the longitudinal arm thereof and carrying a plurality of longitudinally spaced fins extending transversely from the support element, the members being joined with their longitudinal arms connected back-to-back and their adjacent pluralities of transverse fins interleaved with one another.

7. Heat-sink apparatus having, in combination, left- and right-hand heat-conductive members each having a base portion and a finned portion, the base portion of each member including a relatively large contact surface with respect to the size of the base portion, the base portions being joined along the relatively large contact surfaces thereof to enable heat transfer therebetween, the finned portion of each member comprising a longitudinally extending support element connected to the base portion and carrying a plurality of longitudinally spaced fins extending transversely from the support element, at least some of the plurality of fins of the left-hand member being interleaved with at least some of the plurality of fins of the right-hand member.

References Cited by the Examiner

UNITED STATES PATENTS

| | | | |
|---|---|---|---|
| 2,348,852 | 5/1944 | Scharfnagel | 165—185 X |
| 2,965,819 | 12/1960 | Rosenbaum | 165—185 X |
| 3,081,824 | 3/1963 | Macall | 165—185 X |
| 3,149,666 | 9/1964 | Coe | 165—121 |
| 3,183,121 | 5/1965 | Moeller | 165—185 X |
| 3,220,471 | 11/1965 | Coe | 165—121 |

ROBERT A. O'LEARY, *Primary Examiner.*

A. W. DAVIS, *Assistant Examiner.*